United States Patent Office 3,499,728
Patented Mar. 10, 1970

3,499,728
PROCESS FOR THE MANUFACTURE OF HYDROXYL-AMMONIUM-SALTS
Hans Zirngibl, Duisburg, Heinz Heine, Krefeld-Uerdingen, and Rudolf Gerken, Krefeld, Germany, assignors to Farbenfabriken Bayer Aktiengesellschaft, Leverkusen, Germany, a corporation of Germany
No Drawing. Filed Nov. 29, 1966, Ser. No. 597,520
Claims priority, application Germany, Dec. 4, 1965, F 47,846
Int. Cl. C01c 1/28
U.S. Cl. 23—117                     5 Claims

ABSTRACT OF THE DISCLOSURE

Process for the production of hydroxyl-ammonium-salts by the reduction of nitric oxide with hydrogen in an aqueous mineral acid solution with a noble metal catalyst, said reduction being performed in the presence of an inert organic substance reducing the solubility of the hydroxyl ammonium salt formed in said aqueous mineral acid solution.

FIELD OF THE INVENTION

This invention relates to a process for the production of hydroxyl-ammonium salts.

DESCRIPTION OF PRIOR ART

The production of hydroxyl-ammonium salts by the reduction of nitric oxide with hydrogen in an aqueous or alcoholic mineral acid solution in the presence of a noble metal catalyst is known, for example, from German Patent No. 968,363.

It is also known that, in the presence of high hydroxyl-ammonium salt concentrations, especially with a simultaneously low acid concentration, the reaction only proceeds with a poor yield, and that secondary reactions assume disturbing proportions. Accordingly, a number of proposals for improving the reaction have been made, for example, in German Patents Nos. 1,088,037 and 956,038, which are concerned with the specific nature of the catalysts to be used. In addition, a number of improvements have been proposed regarding the procedure used in the process. For example, German Patent No. 885,396 describes a process in which the catalytic reaction of nitric oxide and hydrogen is carried out in the presence of small quantities of organic compounds which comprise polar groups and an average number of carbon atoms, preferably 4 to 10 carbon atoms in the molecule. The polar organic compounds are used in quantities of from 0.2 g. to 1 g. per litre of reaction liquid.

SUMMARY OF THE INVENTION

It is an object of the present invention to provide a process for the production of hydroxyl-ammonium salts with high selectivity and reduction yield.

It is another object of the present invention to provide a process for the production of hydroxyl-ammonium salts yielding said salts in highly concentrated form containing only a small amount of impurities from the reaction mixture.

Other objects will be described as the description proceeds.

This invention provides a process for the production of hydroxyl-ammonium salts by the reaction of nitric oxide with hydrogen in an aqueous mineral acid solution in the presence of a noble metal catalyst at a temperature within the range of from 0° C. to the boiling point of the reaction solution. In this process, the reaction is carried out in the presence of a relatively large quantity of an inert organic compound which lowers the solubility of the hydroxyl-ammonium salt in the aqueous mineral acid suspension. The reaction takes place up to a concentration of the hydroxyl-ammonium salt which is below the saturation point at the reaction temperature in question, that is, the reaction is terminated prior to such time as the hydroxyl-ammonium salt is precipitated from the reaction mixture at the reaction temperature utilized. After the reaction is completed, the catalyst is removed from the reaction mixture at a temperature above the point at which precipitation of the hydroxyl-ammonium salt occurs, e.g., by filtration or decanting. Thereafter the reaction solution is cooled and the crystallized hydroxyl-ammonium salt which has precipitated is removed from the reaction solution, e.g., by filtering or decanting. The resulting reaction solution can be discarded. Preferably at least a part of the solution is admixed with the required amounts of catalyst, mineral acid, inert organic liquid and/or water thereby forming a new reaction mixture.

It has been found that in the process according to the invention, the reaction can be carried out with a good conversion and a high selectivity, almost to the saturation point at which the hydroxyl-ammonium salt precipitates from the reaction mixture. Since it is of decisive importance for the economics of the process that hydroxyl-ammonium salts of the highest possible concentration should be obtained, with a content of free acid and of foreign salts as low as possible, one particular advantage of the invention consists in that solid and substantially pure hydroxyl-ammonium salts can be directly obtained by cooling the reaction solution. Consequently, by comparison with the prior known processes, it is possible to work with higher acid concentrations, which is of great advantage as regards selectivity and yield.

As the inert organic compounds which lower the solubility of the hydroxyl-ammonium salt, it is preferred to use water-soluble lower alcohols, preferably having from 1 to 4 carbon atoms and specifically methanol. The quantities of these inert organic compounds depend on the desired final concentration of the hydroxyl-ammonium salt in the reaction mixture and the reaction temperature. It is advantageous to add between 30% and 70% by volume, based on the total volume of the reaction medium.

The reaction temperature may be between 0° C. and the boiling point of the solution. However, it is advantageous to utilize a reaction temperature of between 40° C. and 60° C. and, after separating out the catalyst, to cool the reaction solution to temperatures of from about 0° C. to 30° C., preferably from about 20° C. to 30° C. and thereafter to remove the precipitated hydroxyl-ammonium salt.

The usual strong inorganic acids are advantageously used, e.g., hydrochloric acid, nitric acid, sulphuric acid or phosphoric acid. The quantity of the acid to be added can vary within a relatively wide range; nevertheless, a quantity of acid must be present which is such that the reaction mixture has a pH value of at least below 2.5. It is advantageous to work with a concentration of free acid of from 0.01 to 5.0 N.

The nitric oxide-hydrogen molar ratio should be in a range of from 1:1.5 to 1:3.0. A hydrogen-nitric oxide ratio of about 1.6:1 to 2:1 is advantageously used. It is possible to work under normal pressure and also under an increased pressure in order to improve the yield per unit volume and per unit time. For economic reasons, it is advantageous to work under normal pressure. When using higher reaction temperatures and adding readily volatile organic substances, it may however be advantageous to work at a pressure which is slightly above atmospheric pressure.

As noble metal catalyst, generally metals of the platinum group, preferably platinum, are used. As known, per se, the noble metals are applied in finely divided form, preferably, on acid resistant carriers such as graphite or active carbon.

The process can be carried out continuously or batchwise, as a single-stage or as a multi-stage process, in suitable reaction apparatus, such as stirrer-type vessels, columns and so on.

According to the present process, hydroxyl-ammonium salts are obtained which are substantially free from acid and which, in addition, are obtained in a coarse crystalline state so that they can be easily filtered. Since the selectivity of the catalysts is not impaired by the addition of the organic substances, only small quantities of ammonium salts are formed when the process is carried out under the best possible conditions as regards pH value and temperature, and these salts, after reaching the saturation concentration, are concurrently precipitated as the hydroxyl-ammonium salts are separated out. The concentration of the ammonium salts is thus kept at a constant level. The small quantities of ammonium salts separated out, which quantities are obtained in the hydroxyl-ammonium salt produced, usually do not have to be separated out, since they do not disturb the usual further processing of the hydroxyl-ammonium salts.

The hydroxyl-ammonium salts obtained by the present invention can be used in organic synthesis, such as the production of lactams, as reducing agents, as photographic developers, as stabilizers, etc.

The invention is illustrated by the following example.

110 ml. of concentrated sulphuric acid were diluted with water, 500 ml. of methanol were added and the resulting mixture was made up to 1000 ml. 25 g. of a catalyst with a graphite base and containing 1% of Pt were then added. A mixture of $H_2/NO$ (2:1) was introduced at 45° C. with stirring. After the introduction of 2.76 mols of NO, the reaction mixture was filtered and cooled to below 20° C. As a result, 120 g. of a salt were precipitated out (composition: 85.2% hydroxyl-ammonium sulphate, 1% ammonium sulphate, 2.1% $H_2SO_4$, 11.7% water/methanol). The mother liquor contained 69.5 g. of hydroxyl-ammonium sulphate and 19.4 g. of ammonium sulphate.

If the percentage of the NO fixed in the $(NH_3OH)_2 SO_4$ and $(NH_4)_2 SO_4$ relative to the NO introduced is referred to as total conversion, and if 100 times the molar ratio of the hydroxyl-ammonium sulphate formed to the sum of the hydroxyl-ammonium sulphate and the ammonium sulphate is called selectivity, a value of 87 mol percent is obtained for both expressions.

For the second passage, the sulphuric acid concentration in the mother liquor obtained above was increased, and the mother liquor was brought with methanol/water to 1 litre and mixed with the catalyst from the previous batch. After the introduction of 1.59 mols of NO (admixed with twice the quantity of $H_2$) at 45° C., the liquor was again filtered off from the catalyst and cooled to below 20° C. As a result, 110 g. of a salt having the composition: 96% hydroxyl-ammonium sulphate, 1.4% ammonium sulphate, 1.4% $H_2SO_4$ and 1.2% methanol/water were obtained. The mother liquor contained 74 g. of hydroxyl-ammonium sulphate and 28.8 g. of ammonium sulphate; it was used for the next passage or through-put. Total conversion in the second through-put: 94% selectivity: 89%.

What we claim is:

1. In a process for the production of hydroxyl-ammonium-salts by introducing gaseous nitric oxide and hydrogen in an aqueous mineral acid solution containing a noble metal catalyst in suspension at temperatures of from between 0° C. and the boiling point of the reaction solution, with a nitric oxide to hydrogen molar ratio of between 1:1.5 and 1:3.0 and a free acid content of between 0.01 and 5.0 N, thereby forming hydroxyl-ammonium salt and removing said formed hydroxyl-ammonium salt from the reaction solution after separating off the catalyst, the improvement which comprises dissolving in said aqueous mineral acid solution an amount of between 30 and 70% by volume of the lower aliphatic alcohol, conducting the reaction to a concentration of hydroxyl-ammonium salt in the reaction mixture which does not exceed the saturation point at the reaction temperature, separating the reaction solution from the catalyst at a temperature above which the hydroxyl-ammonium salt precipitates and cooling the reaction solution to precipitate the hydroxyl-ammonium salt.

2. The process according to claim 1 wherein the aliphatic alcohol is methanol.

3. The process according to claim 1 wherein the reaction is conducted at a temperature of between 40 and 60° C. and after separating the reaction solution from the catalyst, the reaction solution is cooled to a temperature of between 30 and 0° C.

4. The process according to claim 1 wherein the molar ratio of nitric oxide to hydrogen is between 1:1.6 and 1:2.0.

5. The process according to claim 1 wherein the mineral acid is sulfuric acid.

References Cited
UNITED STATES PATENTS 2,827,362   3/1958   Bull et al. _____ 23—117 X

FOREIGN PATENTS 667,870   3/1952   Great Britain.

OSCAR R. VERTIZ, Primary Examiner

E. C. THOMAS, Assistant Examiner

U.S. Cl. X.R.

23—50